United States Patent
Dion et al.

(10) Patent No.: US 10,611,689 B2
(45) Date of Patent: Apr. 7, 2020

(54) PLASTERBOARD

(71) Applicant: SAINT-GOBAIN PLACO, Suresnes (FR)

(72) Inventors: Yann Dion, Livry Gargan (FR); Katarzyna Chuda, Asnieres sur Seine (FR); Caroline Demathieu-Roeltgen, Meaux (FR); Marion Chenal, Montreuil (FR)

(73) Assignee: SAINT-GOBAIN PLACO, Suresnes (FR)

( * ) Notice: Subject to any disclaimer, the term of this patent is extended or adjusted under 35 U.S.C. 154(b) by 0 days.

(21) Appl. No.: 16/084,434

(22) PCT Filed: Mar. 13, 2017

(86) PCT No.: PCT/FR2017/050562
§ 371 (c)(1),
(2) Date: Sep. 12, 2018

(87) PCT Pub. No.: WO2017/158269
PCT Pub. Date: Sep. 21, 2017

(65) Prior Publication Data
US 2019/0077711 A1    Mar. 14, 2019

(30) Foreign Application Priority Data
Mar. 14, 2016    (FR) ..................... 16 52118

(51) Int. Cl.
*C04B 16/00*     (2006.01)
*C04B 28/14*     (2006.01)
(Continued)

(52) U.S. Cl.
CPC ............ *C04B 28/14* (2013.01); *C04B 14/022* (2013.01); *C04B 20/008* (2013.01); *C04B 16/00* (2013.01);
(Continued)

(58) Field of Classification Search
CPC ........... E04C 2/043; C04B 14/022–028; C04B 20/008–0084; C04B 2111/00025; C04B 2111/00405; C04B 2111/0062
See application file for complete search history.

(56) References Cited

U.S. PATENT DOCUMENTS

2004/0101695 A1*   5/2004  Abe ......................... A61L 9/01
                                                            428/454

FOREIGN PATENT DOCUMENTS

EP      1 847 318 A2    10/2007
EP      2 327 672 A1     6/2011
(Continued)

OTHER PUBLICATIONS

Density of Common Materials, retrieved from www.EngineeringToolBox.com (Year: 2019).*
(Continued)

*Primary Examiner* — Ramsey Zacharia
(74) *Attorney, Agent, or Firm* — Pillsbury Winthrop Shaw Pittman LLP

(57) ABSTRACT

A plasterboard includes a first layer of plaster and a second layer of plaster, wherein the first layer includes activated carbon; the second layer includes a scavenging agent, wherein a content of scavenging agent in the first layer, expressed as percentage by weight of dry matter, is less than a content of scavenging agent in the second layer, and wherein the second layer is free of activated carbon.

15 Claims, 1 Drawing Sheet

(51) Int. Cl.
  *C04B 14/00*   (2006.01)
  *C04B 20/00*   (2006.01)
  *C04B 14/02*   (2006.01)
  C04B 111/00   (2006.01)
  C04B 111/10   (2006.01)
  E04C 2/04    (2006.01)

(52) U.S. Cl.
  CPC .............. *C04B 2111/00025* (2013.01); *C04B 2111/00405* (2013.01); *C04B 2111/00612* (2013.01); *C04B 2111/1087* (2013.01); *E04C 2/043* (2013.01)

(56) References Cited

FOREIGN PATENT DOCUMENTS

JP    H10-159244 A   6/1998
WO   WO 2011/148075 A1   12/2011

OTHER PUBLICATIONS

International Search Report as issued in International Patent Application No. PCT/FR2017/050562, dated Jul. 27, 2017.

\* cited by examiner

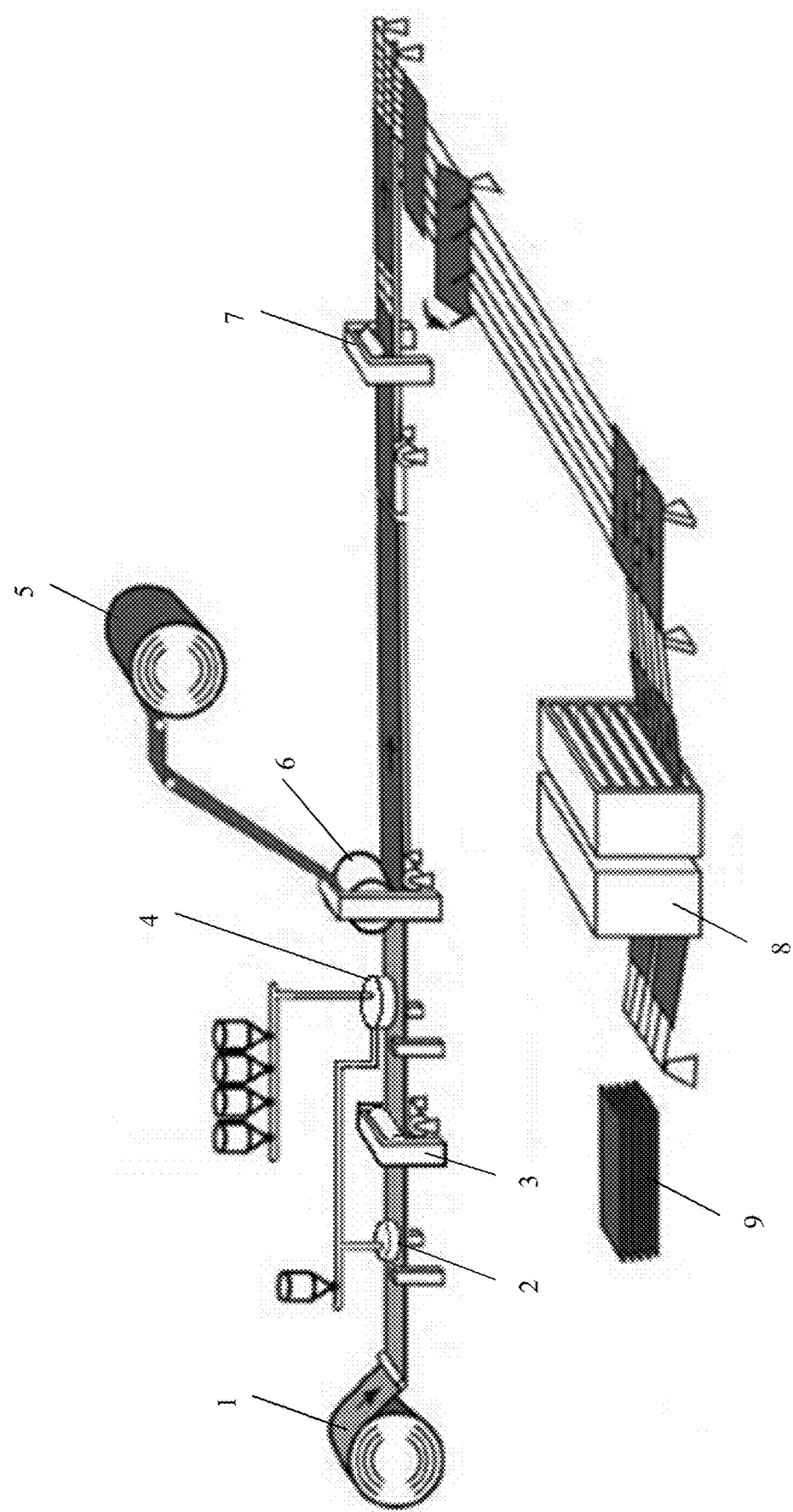

PLASTERBOARD

CROSS-REFERENCE TO RELATED APPLICATIONS

This application is the U.S. National Stage of PCT/FR2017/050562 filed Mar. 13, 2017, which in turn claims priority to French patent application number 1652118 filed Mar. 14, 2016. The content of these applications are incorporated herein by reference in their entireties.

The present invention relates to a plasterboard containing activated carbon and a scavenging agent and also to its use for reducing the content of volatile organic compounds in buildings.

Plasterboards are panels comprising a layer of plaster between two facing sheets generally made of cardboard. Industrially, the process for the manufacture of plasterboards comprises three main stages: the forming, the setting and the drying. During the stage of forming the plasterboard, a mixed batch is continuously prepared in a mixer starting from plaster, water and other specific ingredients in order to adjust the properties of the mixed batch and/or of the final product. It is known in particular to add foaming agents or foam directly in order to reduce the density of the plasterboards. The mixed batch is subsequently poured continuously over a first facing sheet entrained by a conveyor belt toward an extruder in order to form the board. After the edges of the first facing sheet have been folded over, a second facing sheet is introduced at the extruder. The extruder flattens the second facing sheet over the mixed batch, smoothes the surfaces and reduces the thickness of the plasterboard to the desired value. In order to improve the mechanical properties of plasterboards, it is also known to form a layer of denser plaster on one face and optionally on the edges of the plasterboard. For this, a first layer of denser mixed batch, known as roller coating layer, is poured over and formed on the first facing sheet, upstream of the pouring of the main mixed batch, which then forms a second layer known as body of the plasterboard.

Volatile organic compounds (VOCs) are chemical substances based on carbon and hydrogen present in the air in the gas state. European Union Directive 2010/75 of Nov. 24, 2010 defines them as any organic compound having a vapor pressure of 0.01 kPa or more at a temperature of 293.15 K or having a corresponding volatility under the specific conditions of use. They comprise chemical substances of diverse natures, such as alkanes, alkenes, such as terpenes, alkynes, alcohols, aldehydes, such as formaldehyde, acetaldehyde and heptanal, ketones, ethers, such as glycol ethers, aromatic hydrocarbons, such as benzene and toluene, or halogenated hydrocarbons, such as tetrachloroethylene and dichlorobenzene. VOCs are present in the majority of paints, construction materials, dissolvents, detergents and fuels, and also in the resins, varnishes or adhesives used for furniture or electrical appliances, or also in cigarette smoke. These VOCs are encountered in the ambient air of buildings and, even if their amount appears low, they may in the long term bother the people who are exposed to them, indeed even may affect their health. In particular, some VOCs can cause allergic reactions, respiratory problems, nausea or headaches.

In recent years, the proportion of VOCs emitted by the abovementioned materials has greatly decreased as a result of stricter regulations. However, the alternative materials having little or no emission of VOCs often exhibit a greater cost and lower performance levels.

In parallel with the efforts made to control the emission of VOCs, different means which make it possible to reduce the amount of VOCs in the ambient air have thus been provided. Thus, provision has been made to incorporate adsorbing agents, such as activated carbon, in construction materials. Activated carbon exhibits a broad spectrum of absorption of VOCs. However, its adsorption capacity is not identical for all types of VOCs. Furthermore, the VOCs adsorbed in the activated carbon are capable of being again released into the ambient air, in particular under the effect of heat.

Furthermore, the use of scavenging agents (scavengers) in plaster-based materials has also been provided in order to specifically reduce the amount of certain VOCs, such as formaldehyde, in the ambient air inside buildings. Although these scavenging agents are generally specific to VOCs exhibiting a certain type of chemical functional group, indeed even to a specific VOC, they exhibit the advantage of scavenging them in lasting fashion.

In order to improve the quality of the air inside buildings, there exists a demand for plasterboards which make it possible to effectively decrease the concentration of a broad spectrum of VOCs while retaining a specific effectiveness toward certain VOCs, in particular formaldehyde, without risk of subsequent release. It has thus been envisaged to introduce activated carbon and a scavenging agent into a plasterboard in order to advantageously combine their properties. In point of fact, the applicant company has noticed that, surprisingly, there exists an unfavorable interaction between the activated carbon and the scavenging agents which affects their effectivenesses. Thus, one object of the present invention is to provide a plasterboard which makes it possible to retain and to combine the advantages of the activated carbon and of the scavenging agents, without significant modification of the industrial processes for the manufacture of plasterboard.

Thus, one aspect of the present invention relates to a plasterboard comprising a first layer of plaster and a second layer of plaster, characterized in that the first layer comprises activated carbon; the second layer comprises a scavenging agent; the content of scavenging agent in the first layer, expressed as percentage by weight of dry matter, is less than the content of scavenging agent in the second layer; and the second layer is free of activated carbon. The first layer preferably comprises less than 35% by weight, indeed even less than 10% by weight, or even less than 5% by weight, of scavenging agent present in the whole of the plasterboard. The separation of the activated carbon, on the one hand, in the first layer and of the scavenging agent, on the other hand, essentially in the second layer makes it possible to solve or minimize the problem of incompatibility between these two additives demonstrated by the applicant company and thus to retain and combine the effectiveness of each of these additives with regard to their ability to adsorb and/or to fix the VOCs.

The term "plaster" within the meaning of the present invention denotes in general both the set plaster, that is to say calcium sulfate dihydrate ($CaSO_4.2H_2O$), and the non-set plaster, that is to say calcium sulfate hemihydrate ($CaSO_4.\frac{1}{2}H_2O$). The expression "plasterboard" denotes, for example, the finished product formed by set plaster but also a plasterboard in the course of manufacture in which the plaster is not completely set. In some cases, the term "plaster" will, however, be understood within the strict meaning, that is to say denoting calcium sulfate hemihydrate. This is obvious, for example, when the term "plaster" is used with reference to the starting material for the preparation of the mixed batches. Likewise, when reference is made to an amount with respect to the dry weight of plaster, the latter is considered in its calcium sulfate hemihydrate form.

The plasterboard generally has a thickness of 6 to 25 mm, preferably 10 to 15 mm. The first plaster layer is preferably a roller coating layer. The second plaster layer forms the body of the plasterboard. "Roller coating layer" within the meaning of the present invention denotes a plaster layer of low thickness, typically of less than 4 mm, indeed even 2 mm, and exhibiting a density greater than the layer forming the body of the plasterboard. The density of the roller coating layer is typically greater by at least 5% and preferably greater by at most 40%, with respect to the body of the board, for example greater by 15 to 25%, with respect to the body of the board. "Body" of the plasterboard within the meaning of the present invention denotes a layer of plaster, the thickness of which is at least equal to half the thickness of the plasterboard, typically from 6 to 25 mm, preferably from 10 to 15 mm, and the density of which is generally from 0.4 to 1.5, preferably from 0.6 to 1.

In the present invention, the density of a body is defined conventionally, that is to say as the ratio of the density of said body to the density of water, taken equal to 1000 kg/m$^3$.

The activated carbon in accordance with the present invention is preferably a powdered activated carbon. This is because, at an equal specific surface, a powdered carbon exhibits a greater effectiveness of absorption of VOCs than a granulated activated carbon when they are introduced into a plasterboard. Thus, the activated carbon according to the invention typically exhibits a mean particle size of 1 to 100 μm, preferably of 10 to 50 μm. The mean particle size is measured using an air jet sieve according to the standard ASTM-D-5158-93, "*Standard Test Method for Determination of the Particle Size of Powdered Activated Carbon by Air Jet Sieving*". It typically exhibits a specific surface of at least 100 m$^2$/g, preferably of at least 250 m$^2$/g, more preferably of at least 500 m$^2$/g and up to 1500 m$^2$/g, indeed even 2000 m$^2$/g and even 2500 m$^2$/g. The specific surface is measured by using the BET method with nitrogen according to the standard ISO 9277:2010.

The expression "scavenging agent" within the meaning of the present invention defines a scavenging agent for VOCs, that is to say a substance capable of scavenging at least one VOC, in particular formaldehyde, or one type of VOC, in particular aldehydes, by hydrogen, ionic or covalent bonding, preferably by covalent bonding. Examples of scavenging agents within the meaning of the present invention comprise in particular sulfites, tannins, flavonoids, aminoalcohols, compounds comprising a hydrazide group, ammonium salts, ethyleneurea and its derivatives, compounds comprising an active methylene, lactams, in particular caprolactam, polyamines, in particular tetraethylenepentamine, amides, in particular propionamide, zinc-based complexes, in particular the EDTA-Zn complex, and vinyl alcohol.

The sulfites according to the invention comprise in particular ammonium bisulfite, potassium bisulfite, sodium bisulfite, alkali metal metasulfites, in particular sodium metasulfite, or alkaline earth metal metasulfites.

The tannins according to the present invention can be condensed or non-condensed tannins, such as acacia (catechu), mimosa, quebracho, pine, pecan nut, hemlock wood and sumac tannins. The tannins are preferably acacia tannins.

The flavonoids according to the present invention comprise flavones, flavonols, dihydroflavonols, flavanones, aurones, chalcones, dihydrochalcones, flavanols, flavanediols and anthocyanidins. The flavonoids are preferably flavanols, in particular catechin.

Examples of aminoalcohols according to the invention comprise the primary aminoalcohols of formula $R^1R^2R^3$—C—$NH_2$, in which $R^1$, $R^2$ and $R^3$ are chosen independently from H, hydroxyl, $C_1$-$C_6$ alkyl and $C_1$-$C_6$ hydroxyalkyl, at least one of the $R^1$, $R^2$ and $R^3$ comprising a hydroxyl group. Preferred aminoalcohols are 2-amino-2-methyl-1,3-propanediol, 2-amino-2-(hydroxymethyl)propane-1,3-diol (also known as tris(hydroxymethyl)aminomethane) and 2-amino-2-ethyl-1,3-propanediol, in particular 2-amino-2-(hydroxymethyl)propane-1,3-diol.

The compounds comprising a hydrazide group according to the present invention comprise monohydrazide compounds, such as dodecanohydrazide, salicylohydrazide, formohydrazide, acetohydrazide, propionohydrazide, p-hydroxybenzohydrazide, naphthohydrazide and 3-hydroxy-2-naphthohydrazide, dihydrazide compounds, such as oxalodihydrazide, malonodihydrazide, succinodihydrazide, adipodihydrazide, azelodihydrazide, sebacodihydrazide, dodecanedicarbodihydrazide, maleodihydrazide, fumarodihydrazide, diglycolodihydrazide, tartarodihydrazide, malodihydrazide, isophthalodihydrazide, terephthalodihydrazide, 2,5-naphthodihydrazide and 2,4-dihydrazino-6-methylamino-1,3,5-triazine, and polyhydrazide compounds, such as polyacrylohydrazides. The compound comprising a hydrazide group is preferably adipodihydrazide.

Examples of ammonium salts according to the present invention comprise ammonium hydroxide, primary ammonium phosphates and secondary ammonium phosphates.

The ethyleneurea derivatives according to the invention comprise in particular N-hydroxyethyleneurea, N-(aminoethyl)ethyleneurea, N-[(3-allyloxy-2-hydroxypropyl)aminoethyl]ethyleneurea, N-(acryloyloxyethyl)ethyleneurea, N-(methacryloyloxyethyl)ethyleneurea, N-(acryloylaminoethyl)ethyleneurea, N-(methacryloylaminoethyl)ethyleneurea, N-(methacryloyloxyacetoxy)ethyleneurea, N-(methacryloyloxyacetaminoethyl)ethyleneurea and N-[di(3-allyloxy-2-hydroxypropyl)aminoethyl]ethyleneurea. The ethyleneurea derivative is preferably ethyleneurea itself.

The expression "active methylene" within the meaning of the present invention defines a methylene, optionally substituted by a substituent, bonded to two electron-donating functional groups, in particular comprising a carbonyl group. Examples of compounds comprising an active methylene according to the invention are the compounds of formula (1):

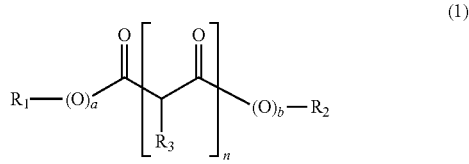

(1)

in which:
$R_1$ and $R_2$, which are identical or different, represent a hydrogen, a $C_1$-$C_{20}$, preferably $C_1$-$C_6$, alkyl, an amino or

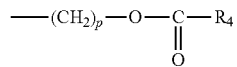

in which p is an integer from 1 to 6 and $R_4$ represents

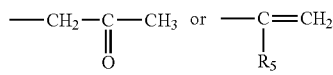

in which $R_5$ is a hydrogen or a methyl;
$R_3$ represents a hydrogen, a $C_1$-$C_{10}$ alkyl, a phenyl or a halogen;
a has the value 0 or 1;
b has the value 0 or 1; and
n has the value 1 or 2.

A preferred compound of formula (1) is acetoacetamide.

In a preferred embodiment, the scavenging agent is chosen from aminoalcohols, compounds comprising a hydrazide group and compounds comprising an active methylene, more preferably chosen from acetoacetamide and adipodihydrazide.

The plasterboard according to the invention typically comprises from 0.01 to 2%, preferably from 0.05 to 1%, by weight of activated carbon, with respect to the dry weight of plaster. The activated carbon is preferably present solely in the first plaster layer. In other words, the second plaster layer forming the body of the plasterboard is free of activated carbon, in particular of powdered activated carbon. This is because the applicant company has noticed that powdered activated carbon has antifoaming properties, which undesirably increases the density of the plasterboard when it is introduced into the body of the board. The first plaster layer preferably satisfies one or more of the following conditions:
a thickness of 0.1 to 4 mm, in particular of 0.8 to 3 mm;
a density of 0.8 to 1.5, in particular of 1 to 1.2; and
a content of activated carbon of 0.2 to 10%, in particular of 1 to 5%, by weight, with respect to the dry weight of plaster.

The plasterboard according to the invention typically comprises from 0.01 to 2%, preferably from 0.05 to 1%, by weight of scavenging agent, with respect to the dry weight of plaster. The scavenging agent is present in the second plaster layer, that is to say that the layer can comprise at least 65%, indeed even at least 90%, or even at least 95%, by weight of the amount of scavenging agent present in the plasterboard. The first plaster layer can comprise up to 35% by weight, preferably up to 10% by weight, indeed even up to 5% by weight, of the amount of scavenging agent present in the plasterboard. The ratio by weight of the amount of scavenging agent to the amount of activated carbon in the first plaster layer is preferably less than 1/10. In a preferred embodiment, the first plaster layer is free of scavenging agent. The scavenging agent is then present solely in the second plaster layer.

The second plaster layer c satisfies one or more of the following conditions:
a thickness of 6 to 25 mm, in particular of 10 to 15 mm;
a density of 0.4 to 1.5, in particular of 0.6 to 1; and
a content of scavenging agent of 0.01 to 2%, in particular of 0.05 to 1%, by weight, with respect to the dry weight of plaster.

The plasterboard according to the invention can comprise processing aids which make it possible to adjust the properties of the mixed batches and also other functional agents which make it possible to modify the properties of the final plasterboard. The processing aids well known to a person skilled in the art can in particular be adhesion agents, setting accelerators, setting retarders, plasticizers, thickening agents or antifoaming agents. The functional agents also well known to a person skilled in the art can be foaming agents, biocidal agents, water repellents, flame retardants or reinforcing agents. If appropriate, the additional functional agents can be introduced in the first and/or second layer.

Another aspect of the present invention relates to a process for the manufacture of a plasterboard as defined above, comprising a forming stage, a setting stage and a drying stage, characterized in that the forming stage comprises:
the provision of a first facing sheet;
the pouring of a first mixed batch over the first facing sheet;
the pouring of a second mixed batch over the first mixed batch;
the provision of a second facing sheet over the second mixed batch; and
the forming of the plasterboard using an extruder;
in which the first mixed batch comprises activated carbon; the second mixed batch comprises a scavenging agent; the content of scavenging agent in the first mixed batch, expressed as percentage by weight of dry matter, is less than the content of scavenging agent in the second mixed batch; and the second mixed batch is free of activated carbon. The first mixed batch preferably comprises less than 35% by weight, indeed even less than 10% by weight, or even less than 5% by weight, of the amount of scavenging agent present in the whole of the mixed batches. In a specific embodiment, the first mixed batch is free of scavenging agent.

After setting and drying, the first and second mixed batches respectively form the first plaster layer and the second plaster layer as are defined above. The first mixed batch thus forms a roller coating layer, while the second mixed batch preferably forms the body of the board. The mixed batch intended to form the body of the board is referred to hereinafter as "main mixed batch".

BRIEF DESCRIPTION OF THE DRAWING

FIG. 1 diagrammatically illustrates an example of an industrial line for the manufacture of plasterboard with a roller coating layer in accordance with an embodiment of the invention.

FIG. 1 diagrammatically illustrates an example of an industrial line for the manufacture of plasterboard with a roller coating layer. A first facing sheet 1 generally forming the front face of the plasterboard (face visible during the installation of the board) is entrained by a conveyor belt. A first mixed batch is poured continuously from a secondary mixer 2 over the first facing sheet 1 and formed into a first homogeneous layer by an assembly of rollers 3. This first layer will give the roller coating layer. At a predetermined distance which makes possible sufficient setting of the first layer, the main mixed batch is poured from a main mixer 4 over the first layer. A second facing sheet 5 is introduced above the main mixed batch at the main extruder 6. A strip of plaster is extruded at the desired thickness by the main extruder 6, which distributes the main mixed batch to form the layer which will give the body of the board. After the transportation of the strip of plaster for a period of time appropriate for allowing sufficient setting of the plaster, the strip of plaster is cut to the desired dimension by a rotating knife 7. The board is subsequently generally turned over in order to prevent damage to the front face of the board and transported toward a series of dryers in stage 8, in order to complete the setting of the plaster and to remove the excess water, before being packaged and sent to the storage zone 9.

The main mixed batch typically comprises, per 100 parts by weight of plaster:
  from 40 to 200 parts of water;
  from 2 to 10 parts of foam obtained from a mixture of water and of a foaming agent, for example an alkyl sulfate, optionally as a mixture with an alkyl ether sulfate; and
  from 0.1 to 1 part of setting accelerator, for example calcium sulfate hydrate or potassium sulfate.

It can also comprise one or more of the following components:
  from 0.1 to 15 parts of an adhesion agent, for example a poly(vinyl acetate), a poly(vinyl alcohol), a starch, in particular pretreated with an acid or pregelatinized, a dextrin or a vegetable flour, in particular wheat or corn flour;
  from 0.001 to 10 parts of a biocide, for example carbamates, such as 3-iodoprop-2-yn-1-yl butylcarbamate, or pyrothione complexes;
  from 0.1 to 10 parts of at least one water repellent, for example a siloxane, a polysiloxane or a wax;
  from 0.1 to 20 parts of at least one flame retardant, for example vermiculite, silica, in particular of micrometric dimension, or a clay; and/or
  from 0.1 to 20 parts of at least one reinforcing agent, for example polymer fibers, mineral fibers, in particular glass fibers, or plant fibers.

The first mixed batch intended for the roller coating layer can be prepared independently or, as illustrated in FIG. 1, it can be obtained from the main mixed batch. In the latter case, a pipe makes it possible to convey a portion of the main mixed batch from the main mixer 4 to the secondary mixer 2. It is then necessary to add thereto an antifoaming agent and optionally a plasticizer in order to break the foam present in the main mixed batch and to obtain a roller coating layer having the desired density. The powdered activated carbon has the distinguishing feature of having antifoaming properties. The addition of powdered activated carbon at the roller coating layer thus has the advantage of requiring reduced addition, indeed even no addition, of antifoaming agent when the mixed batch intended for the roller coating layer is prepared from the main mixed batch. Alternatively, the main mixed batch can be obtained from the secondary mixed batch. In this case, the secondary mixed batch is prepared in the secondary mixer and a pipe makes it possible to convey a portion of the secondary mixed batch from the secondary mixer to the main mixer. The secondary mixed batch can, as for the main mixed batch, comprise additives as mentioned above. These additives are generally added to the secondary mixed batch in proportions equivalent to those mentioned for the main mixed batch. Some additions can also be carried out at the main mixer in order to adjust the properties of the main mixed batch. In particular, a first foam can be introduced into the secondary mixed batch at the secondary mixer, while a second foam can be introduced into the main mixed batch at the main mixer. Said first and second foams can be identical or different (in particular in terms of density and/or bubble size) and are generally introduced in different amounts into the respective mixed batches.

When the first mixed batch is obtained from the second mixed batch, it then necessarily contains a certain amount of scavenging agent. This amount is preferably less than 35% by weight, indeed even less than 10% by weight, or even less than 5% by weight, of the amount of scavenging agent present in the whole of the mixed batches. The ratio by weight of the amount of scavenging agent to the amount of activated carbon in the first mixed batch is then preferably less than 1/10. However, it is preferable for the first mixed batch not to be prepared from the second mixed batch in order for the first mixed batch, and consequently the first plaster layer obtained from the latter, to be free of scavenging agent.

The activated carbon, in particular powdered activated carbon, is preferably added to the secondary mixer in the form of an aqueous suspension comprising a plasticizer. This is because the applicant company has noticed that a premix of the powdered activated carbon with the plasticizer makes it possible to obtain a sufficiently stable suspension making possible suitable metering of the activated carbon, in particular during continuous industrial processes, and a more homogeneous distribution of the latter in the mixed batch obtained and consequently in the plasterboards manufactured. The premix typically comprises from 1 to 25% by weight, preferably from 5 to 15% by weight, of powdered activated carbon. It typically comprises at least 0.01%, preferably from 0.05 to 5% and more preferably from 0.1 to 3% by weight of plasticizer. The plasticizer can be chosen in particular from polycarboxylates, in particular polycarboxylate ethers, sulfonated polynaphthalenes (salts of sulfonated polycondensates of naphthalene and formaldehyde), lignosulfonates, sulfonated melamine resins (salts of sulfonated polycondensates of melamine and formaldehyde) and polyacrylates commonly used in the manufacture of plasterboards. Mention may be made, as examples of plasticizers, of those sold under the Glenium® name by BASF, under the Flube® name by Bozzetto, under the Chrysofluid® name by Chryso, under the Viscocrete® name by Sika, under the Melment® name by BASF or also under the Mapefluid® name by Mapei. The plasticizer is preferably chosen from sulfonated polynaphthalenes and sulfonated melamine-formaldehyde resins, more preferably from sulfonated polynaphthalenes.

The present invention also relates to the use of a plasterboard as described above for reducing the amount of VOCs in the air inside buildings. The VOCs are preferably chosen from formaldehyde, hexanal, benzene, toluene, tetrachloroethene, 1,2-dichlorobenzene and undecane.

The invention is illustrated with the help of the following nonlimiting examples.

EXAMPLE

Reference boards R1 to R3 and according to the invention I1 were manufactured from different main mixed batches, intended for the formation of the body of the boards, and secondary mixed batches, intended for the formation of the roller coating layers. Each main mixed batch has, as base composition, 100 parts by weight of plaster ($CaSO_4 \cdot \frac{1}{2}H_2O$), 75 parts of water, 3 parts of foam (obtained from water containing 1% by weight of sodium lauryl sulfate), 5 parts of starch, 3 parts of plasticizer and 0.5 part of setting accelerator. Each secondary mixed batch has, as base composition, 100 parts by weight of plaster ($CaSO_4 \cdot \frac{1}{2}H_2O$), 77 parts of water, 5 parts of starch, 3.2 parts of plasticizer and 0.5 part of setting accelerator.

The boards R1 and R3 without a roller coating layer were prepared as follows. The different ingredients are weighed and mixed using a mixer and a paddle of deflocculating type at 1600 rev/min for one minute in order to obtain a homogeneous paste. The foam is prepared at the desired density and mixed with the paste obtained in a mixer with a paddle at 250 rev/min in order to obtain a main mixed batch. A first sheet of cardboard is positioned in a mold having dimensions of 20×25 cm and with a thickness of 12.5 mm. The main mixed batch is poured onto the first cardboard and leveled at the thickness of the mold. A second sheet of cardboard is positioned on the main mixed batch and the mold is closed in order to maintain a pressure on the board. After hardening of the board, the latter is removed from the mold and dried in a drying oven at 40° C. for 24 hours.

For the boards R2, R4 and P1 with a layer of roller coating, the ingredients for the secondary mixed batch are weighed and mixed using a mixer and a paddle of deflocculating type at 1600 rev/min for one minute. A first sheet of cardboard is positioned in a mold having dimensions of 20×25 cm and with a thickness of 12.5 mm. The secondary mixed batch is poured onto the first cardboard and leveled at a thickness of approximately 1 mm. The main mixed batch is prepared as for the boards R1 and R3 and poured onto the secondary mixed batch when the latter is sufficiently set, and leveled at the thickness of the mold. A second sheet of cardboard is positioned on the main mixed batch and the mold is closed in order to maintain a pressure on the board. After hardening of the board, the latter is removed from the mold and dried in a drying oven at 40° C. for 24 hours.

Tables 1 and 2 show the additives, activated carbon (AC) or acetoacetamide (AA), added, if appropriate, to the mixed batches before manufacture of the boards. The value in brackets indicates the percentage by dry weight of the additive in the layer under consideration. The symbol "–" indicates that no additive is added to the corresponding mixed batch. The symbol "x" indicates that the board does not comprise the corresponding layer. The activated carbon used is a powdered activated carbon sold under the reference Pulsorb® 208CP and having a specific surface of 1200 m²/g and a mean particle size of approximately 30 μm. For each board, the body has a thickness of 11.5 mm, except for the boards P4, which exhibit a thickness of 12.5 mm, and the roller coating layers each have a thickness of 1 mm.

The ability of each of the boards to trap VOCs was evaluated from the viewpoint of the absorption and of the desorption according to the standards ISO1600-24:2009 and ISO1600-23:2009 at a temperature of 23° C.±2° C. and a relative humidity of 50%±5% during the test. The load factor of the board is set at 1 and the degree of replacement of the air at 0.5 vol.h$^{-1}$. Two series of independent measurements were carried out in order to evaluate their ability to trap, on the one hand, toluene and, on the other hand, formaldehyde. For each series of measurements, the boards were subjected to a phase of absorption (14 days for toluene; 7 days for formaldehyde) during which the air is replaced with a stream of air comprising a VOC (at a concentration of 40 μg·m$^{-3}$ for toluene; 100 μg·m$^{-3}$ for formaldehyde), in order to measure the degree of absorption for the VOC under consideration, and then to a phase of desorption (7 days for toluene; 7 days for formaldehyde) during which the air is replaced with a stream of fresh air (without VOC), in order to measure the degree of desorption for the VOC under consideration.

Table 1 shows the percentage of reduction (absorption) in the content of formaldehyde and toluene and the percentage of desorption of formaldehyde and toluene for each of the boards.

TABLE 1

|  |  | R1 | R2 | R3 | R4 | P1 |
|---|---|---|---|---|---|---|
| Body |  | — | — | AA (0.12) | — | AA (0.12) |
| Roller Coating |  | x | AC (2) | x | AC (2) AA (1.5) | AC (2) |

TABLE 1-continued

|  |  | R1 | R2 | R3 | R4 | P1 |
|---|---|---|---|---|---|---|
| Absorption (%) | Formaldehyde | 37 | 50 | 93 | 94 | 89 |
|  | Toluene | 0 | 98 | 10 | 8 | 85 |
| Desorption (%) | Formaldehyde | 58 | 17 | <2 | n.m. | <2 |
|  | Toluene | <1 | <1 | <1 | n.m. | <1 | n.m.: not measured

The board R3 comprising a scavenging agent exhibits a good absorption of formaldehyde but does not make possible a sufficient reduction in the content of the other VOCs, in particular toluene. The board R2 comprising activated carbon makes possible a correct abatement of a broad spectrum of VOCs, including formaldehyde, but the latter is not permanently fixed, as is shown by the high desorption value for formaldehyde. The board R4 comprising a combination of a scavenging agent and of activated carbon is not very effective with regard to toluene. On the other hand, the board P1 according to the invention makes possible both a significant abatement and a permanent scavenging of the formaldehyde and toluene.

The invention claimed is:

1. A plasterboard comprising a first layer of plaster and a second layer of plaster, wherein the first layer comprises activated carbon; the second layer comprises a scavenging agent, wherein a content of scavenging agent in the first layer, expressed as percentage by weight of dry matter, is less than a content of scavenging agent in the second layer, and wherein the second layer is free of activated carbon, wherein a ratio by weight of an amount of scavenging agent to an amount of activated carbon in the first layer of plaster is less than 1/10.

2. The plasterboard as claimed in claim 1, wherein the first layer has a thickness of 0.1 to 4 mm.

3. The plasterboard as claimed in either one of claims claim 1, wherein the first layer has a density of 0.8 to 1.5.

4. The plasterboard as claimed in claim 1, wherein the first layer is free of scavenging agent.

5. The plasterboard as claimed in claim 1, wherein the second layer has a thickness of 6 to 25 mm.

6. The plasterboard as claimed in claim 1, wherein the second layer has a density of 0.4 to 1.5.

7. The plasterboard as claimed in claim 1, wherein the first layer has a density greater than the density of the second layer.

8. The plasterboard as claimed in claim 1, wherein the activated carbon is a powdered activated carbon.

9. The plasterboard as claimed in claim 1, wherein the activated carbon has a mean particle size of 1 to 100 μm.

10. The plasterboard as claimed in claim 1, wherein said plasterboard comprises from 0.01 to 2% by weight of activated carbon, with respect to the dry weight of plaster.

11. The plasterboard as claimed in claim 1, wherein the scavenging agent is chosen from compounds comprising a hydrazide group, compounds comprising an active methylene and their mixtures.

12. The plasterboard as claimed in claim 1, wherein said plasterboard comprises from 0.01 to 2% by weight of scavenging agent, with respect to the dry weight of plaster.

13. A process for the manufacture of a plasterboard as claimed in claim 1, said process comprising a forming stage, a setting stage and a drying stage, wherein the forming stage comprises:

providing a first facing sheet;
pouring a first mixed batch over the first facing sheet;
pouring a second mixed batch over the first mixed batch;
providing a second facing sheet over the second mixed batch; and
forming the plasterboard using an extruder;
wherein the first mixed batch comprises activated carbon; the second mixed batch comprises a scavenging agent, wherein the content of scavenging agent in the second first mixed batch, expressed as percentage by weight of dry matter, is less than the content of scavenging agent in the second mixed batch, wherein the second mixed batch is free of activated carbon, and
wherein a ratio by weight of an amount of scavenging agent to an amount of activated carbon in the first mixed batch is less than $1/10$.

14. The process as claimed in claim 13, wherein the first mixed batch is free of scavenging agent.

15. A method comprising reducing an amount of volatile organic compounds in the air inside buildings with a plasterboard as defined in claim 1.

\* \* \* \* \*